(12) United States Patent
Mellor et al.

(10) Patent No.: US 6,276,740 B1
(45) Date of Patent: Aug. 21, 2001

(54) METHOD OF SECURING COMPONENTS TOGETHER AND A STRUCTURAL MEMBER MADE BY SAID METHOD

(75) Inventors: Michael Mellor, Birmingham; Michael David Shergold, Worcester, both of (GB)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/485,839

(22) PCT Filed: Jun. 8, 1998

(86) PCT No.: PCT/GB98/01669

§ 371 Date: Feb. 16, 2000

§ 102(e) Date: Feb. 16, 2000

(87) PCT Pub. No.: WO99/10219

PCT Pub. Date: Mar. 4, 1999

(30) Foreign Application Priority Data

Aug. 21, 1997 (GB) .................................................. 9717701
Feb. 27, 1998 (GB) .................................................. 9804126

(51) Int. Cl.[7] .......................... B62D 27/02; B62D 25/14; B21D 39/06; B21D 26/01
(52) U.S. Cl. .............................. 296/72; 280/90; 29/897.2; 29/421.1
(58) Field of Search ................................ 296/70, 72, 193, 296/194, 203.02, 203.05; 180/90; 280/728.2, 732, 779; 72/61; 29/897.2, 421.1, 523

(56) References Cited

U.S. PATENT DOCUMENTS

| 4,660,269 | 4/1987 | Suzuki . | |
|---|---|---|---|
| 4,882,825 | 11/1989 | Nakamura . | |
| 5,238,286 | * 8/1993 | Tanaka et al. | 296/70 |
| 5,752,718 | * 5/1998 | Schnabel et al. | 296/72 X |
| 5,806,916 | * 9/1998 | Sinner et al. | 296/72 X |
| 5,868,426 | * 2/1999 | Edwards et al. | 180/90 |
| 5,934,733 | * 8/2000 | Manawaring | 296/72 |
| 5,951,045 | * 9/1999 | Almefelt et al. | 180/90 X |
| 5,951,087 | * 9/1999 | Bittinger et al. | 296/72 |
| 6,110,037 | * 8/2000 | Yoshinaka | 296/70 X |
| 6,139,082 | * 10/2000 | Davis, Jr. et al. | 296/72 |

FOREIGN PATENT DOCUMENTS

| 19548341 | 12/1996 | (DE) . |
| 0338923 | 10/1989 | (EP) . |
| 0760330 | 3/1997 | (EP) . |
| 0284271 | 9/1998 | (EP) . |
| 2100641 | 1/1983 | (GB) . |

* cited by examiner

Primary Examiner—Joseph D. Pape
Assistant Examiner—Patricia Engle
(74) Attorney, Agent, or Firm—Davis & Bujold, P.L.L.C.

(57) ABSTRACT

A method of securing two or more components together is disclosed in which one of the members is made from a thin wall tubular material that can be expanded by a hydroforming technique to cause deformation which is used to secure one or more components (11, 12, 13, 14; 111, 122, 123 and 114) to the tubular member (9, 109).

14 Claims, 3 Drawing Sheets

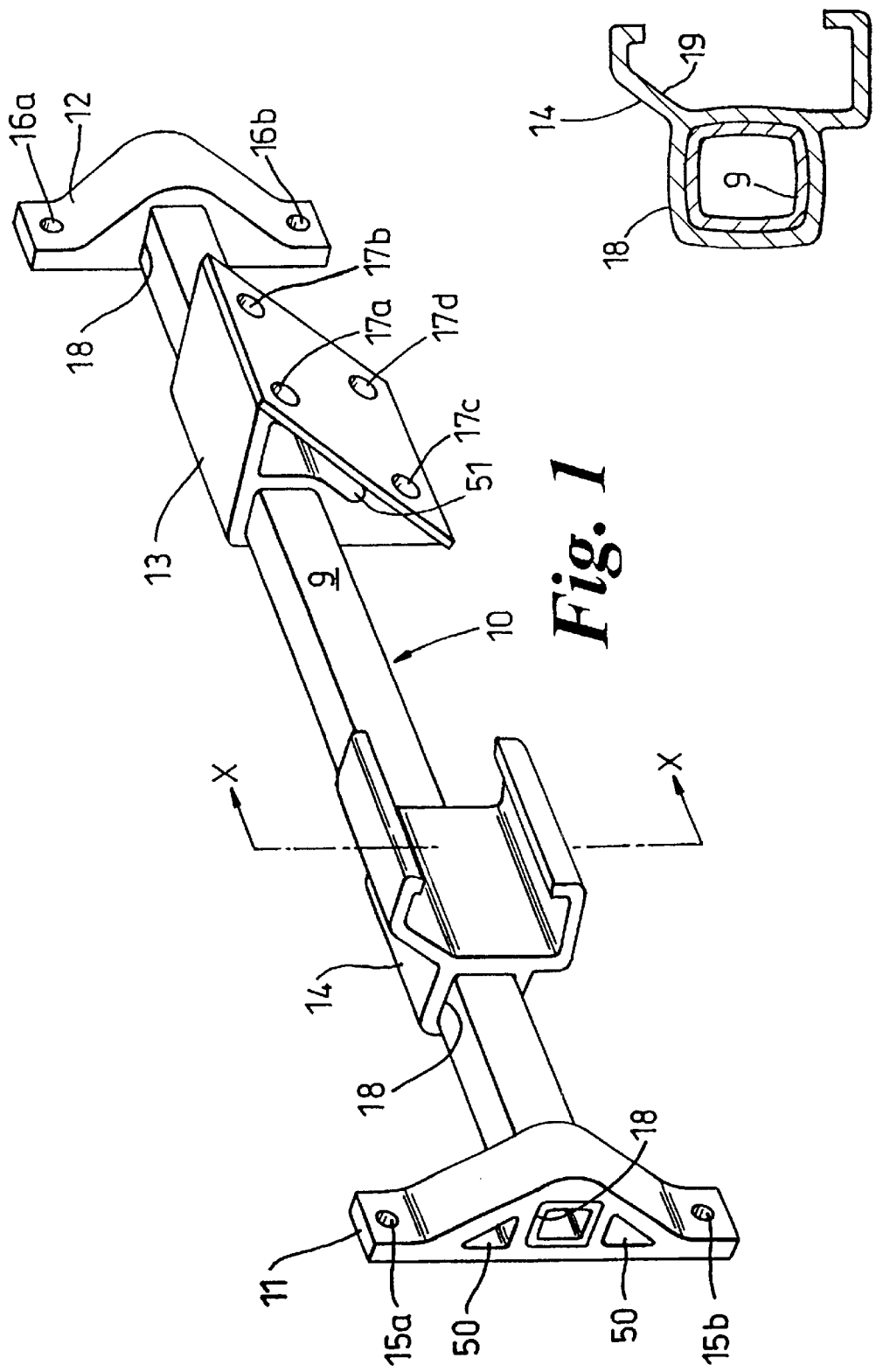

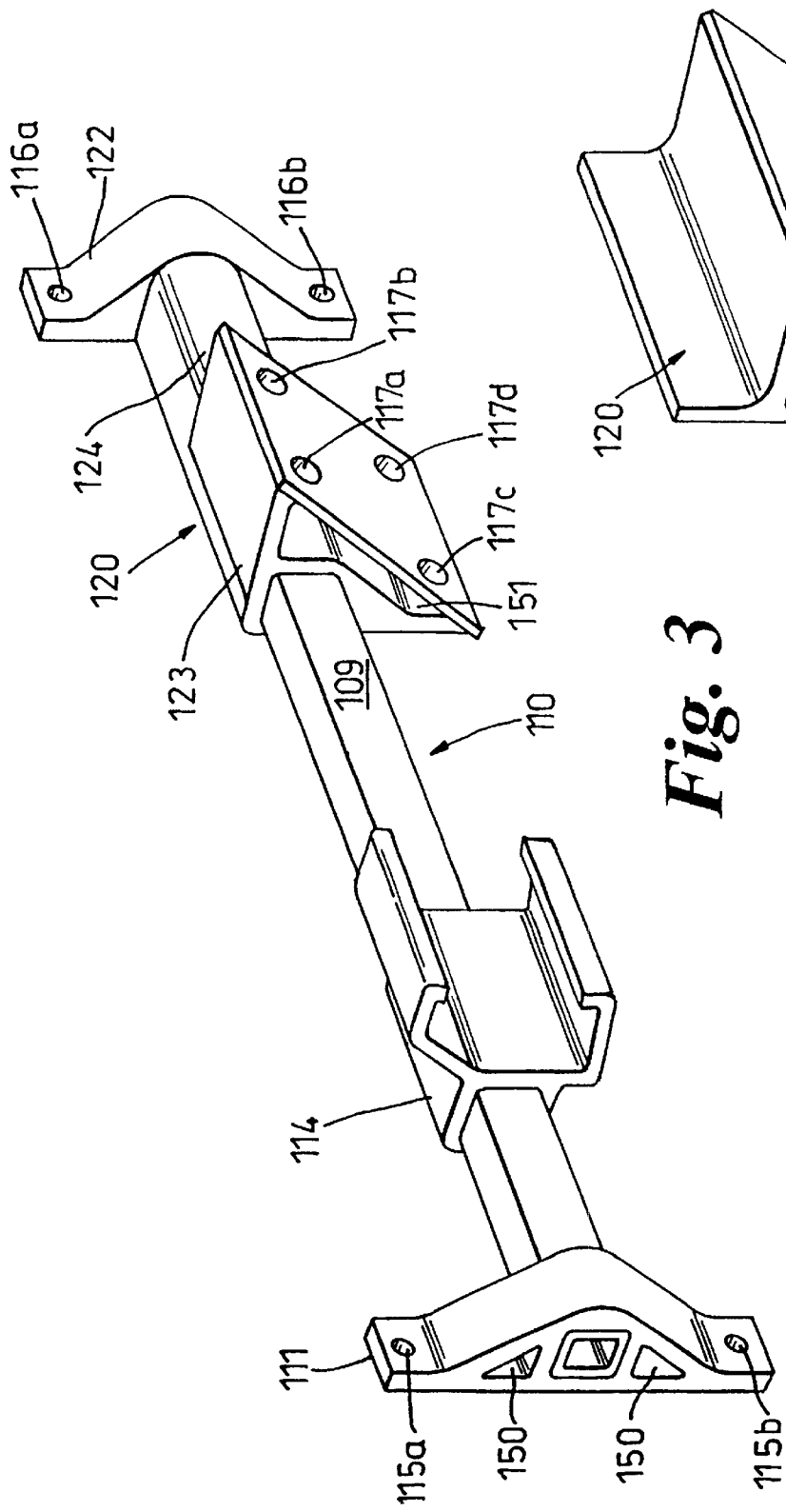
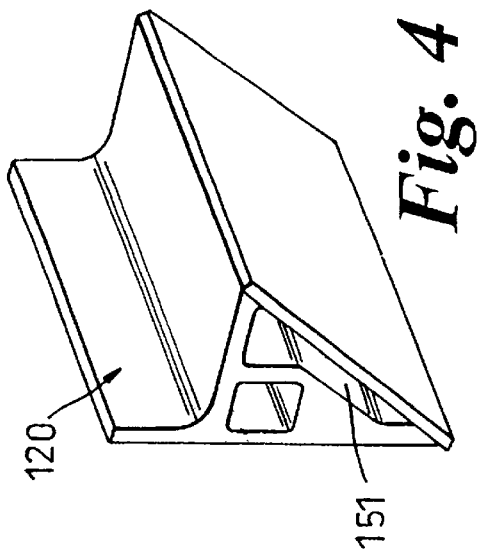

METHOD OF SECURING COMPONENTS TOGETHER AND A STRUCTURAL MEMBER MADE BY SAID METHOD

BACKGROUND OF THE INVENTION

This invention relates to a method of making an elongate structural member and a structural member made according to the method and in particular to a beam for use in a motor vehicle.

It is known to provide a transverse beam for a motor vehicle extending from one side of the motor vehicle to the other side of the motor vehicle behind a dashboard of the motor vehicle in order to support an airbag housing for a passenger of the motor vehicle. The transverse beam acting as a structural member able to withstand the forces imposed upon it by an airbag fitted within the airbag housing.

It is a problem with known transverse beam arrangements that they are difficult and expensive to manufacture.

SUMMARY OF THE INVENTION

According to a first aspect of the invention there is provided a method of securing two or more components together the method comprising, selecting a tubular member having a predetermined length, width, height and wall thickness, locating a component having a corresponding aperture therein upon said tubular member, sealing the ends of said tubular member, introducing fluid to the interior of the tubular member to plastically deform the tubular member into engagement with said component so as to provide an interference fit therebetween and releasing the pressure within the tubular member.

There may be several components secured to the tubular member each having an aperture corresponding in size and shape to that of the tubular member.

The tubular member and the or each component may be made from dissimilar materials.

The tubular member may be made from structural steel tube and the components may be made from a non ferrous material such as aluminium alloy.

The components may be made by extrusion.

According to a second aspect of the invention there is provided a structural member made in accordance with the method as described above in which the member comprises of an elongate tubular member having at least one component secured thereto used to fasten the structural member to other structural elements.

The structural member may be a transverse beam for fitment behind the dashboard of a motor vehicle.

The transverse beam may have a fixing bracket secured near to each end by said process, the brackets being used to secure the transverse beam to part of the structure of the motor vehicle to which the beam is fitted.

The transverse beam may have a steering column support bracket secured thereto by said process.

The steering column support bracket and one of the fixing brackets may be formed as a one piece component.

The transverse beam may have an airbag housing secured thereto by said process.

The airbag housing and one of the fixing brackets may be formed as a one piece component.

Alternatively, the airbag housing may be a separate component fixed to the transverse beam using a housing bracket. The airbag housing being secured to the housing bracket using a key element or rail. The airbag housing could be secured to the housing bracket either prior to or subsequent to securing the housing bracket to the transverse beam.

The airbag housing and housing bracket may be locked together through a lock element therebetween.

The tubular member may be made from thin walled steel tube.

At least one of said components may be made from extruded aluminium alloy.

BRIEF DESCRIPTION OF THE DRAWINGS

The invention will now be described by way of example with reference to the accompanying drawing of which:

FIG. 1 is a pictorial representation of a first embodiment of a structural member according to the invention;

FIG. 2 is a cross-section along the line X—X on FIG. 1;

FIG. 3 is a pictorial representation showing a second embodiment of a structural member according to the invention;

FIG. 4 is a pictorial representation of a combined steering column and fixing bracket in a pre-machine state.

DESCRIPTION OF THE PREFERRED EMBODIMENTS

Figure 5:
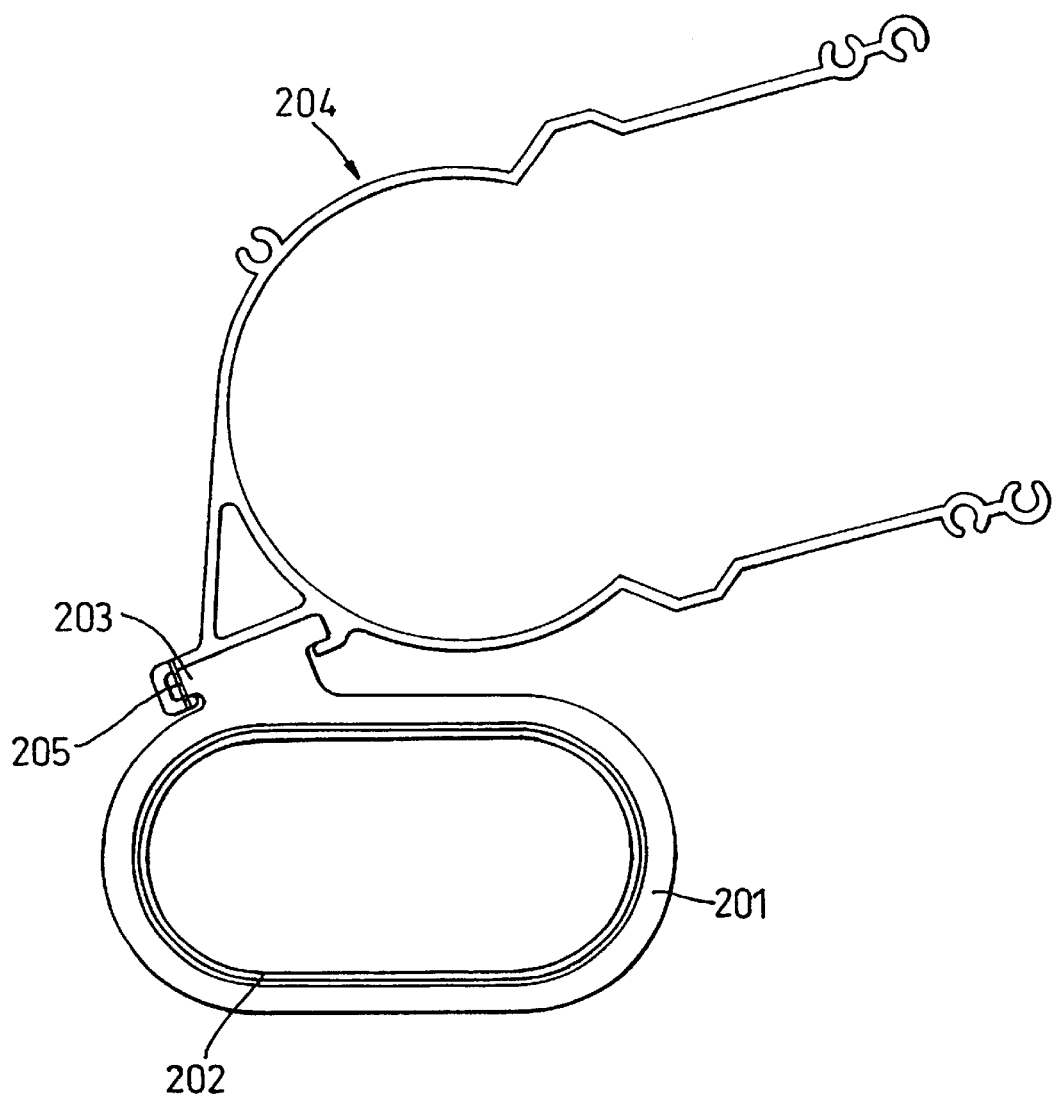
FIG. 5 is a pictorial side elevation of an airbag housing secured to a structural member through a housing bracket.

With reference to FIGS. 1 and 2 there is shown a structural member 10 comprising of an elongate tubular member 9 upon which is engaged a pair of fixing brackets 11, 12, a steering column support bracket 13 and an airbag housing 14. The structural member 10 forms a transverse beam assembly for mounting behind a dashboard of a motor vehicle.

The elongate tubular member 9 is made from thin wall steel tube and has a first fixing bracket 11 secured to one end and a second fixing bracket 12 secured to the opposite end. The fixing brackets 11, 12 have apertures 15A, 15B; 16A, 16B formed therein through which bolts may be passed to connect the structural member 10 to part of the structure of the motor vehicle to which the structural member 10 is fitted.

The fixing brackets 11, 12 are made from an aluminium alloy by an extrusion process such that a long length of extruded aluminium is produced having the correct outer and inner profile to form the fixing brackets. The length of extruded material is then cut into lengths equal to the width of each of the fixing brackets 11, 12. This provides a very cheap and cost effective way of manufacturing the fixing brackets 11, 12.

The steering column support bracket is made by extrusion from an aluminium alloy and has a number of threaded apertures 17A, 17B, 17C and 17D which are used to attach the steering column of the motor vehicle to which the structural member 10 is fitted.

The airbag housing 14 is made from an aluminium alloy by extrusion and has a C-shaped cavity 19 therein into which an airbag assembly can be fitted.

To manufacture the structural member 10 a tubular member 9 is selected having a predetermined length, width, height and wall thickness to provide the desired strength and deflection properties for the structural beam being produced. The components to be secured to the tubular member 9 are then located thereon each of the components having an internal aperture 18 corresponding in size and shape to that of the tubular member 9 such that they can fit thereupon with a small clearance. The fixing brackets 11, 12, the steering column support bracket 13 and the airbag support housing 14 are then, along with the tubular member 9, placed in a positioning jig to ensure the correct spacing and orientation is achieved.

The ends of the tubular member 9 are then sealed off such that fluid can be admitted to one end of the tubular member and the interior of the tubular member is pressurised by a pump (not shown) which raises the pressure of the fluid contained within the tubular member 9.

By increasing the fluid within the tubular member 9 it is caused to plastically deform causing expansion which results in the tubular member 9 becoming an interference fit with the components 11, 12, 13 and 14 fitted thereupon. In addition if the pressure is increased sufficiently the tubular member 9 will be caused to bulge slightly on either side of each of the components causing them to be both axially and longitudinally secured to the tubular member 9.

The pressure within the tubular member 9 is then released but because of the plastic deformation that has been caused the tubular member 9 remains in an interference fit condition with respect to the components 11, 12, 13, 14 such that the components are subjected to a slight tension by the inter-engagement and the tubular member 9 is subject to a small compression loading due to the inter-engagement.

Such deformation by pressurisation is often referred to as hydroforming.

It will therefore be appreciated that components of dissimilar materials have been secured together in a simple and cost effective manner without requiring welding or adhesive bonding.

With reference to FIGS. 3 and 4 there is shown a structural member 110 which is in many respects the same as the structural member previously described and for which common parts are given the same reference numeral with the addition of 100.

The structural member 110 comprises of an elongate tubular member 109 upon which is engaged a number of components 111, 114 and 120. The components 111, 114 and 120 are secured to the tube in the same way as that previously described that is to say the tubular member 109 is pressurised by pumping fluid into the interior thereof causing the tubular member 109 to be plastically deformed so as to secure the components 111, 114 and 120 to it.

The first fixing bracket 111 is as previously described and has two fixing holes 115A and 115B used to secure the fixing bracket to part of the body structure of the motor vehicle.

The airbag housing 114 is identical to that described with reference to FIG. 1.

The second fixing member 122 and the steering column support member 123 are different from that previously described in that they are made as a one piece assembly 120 from a single aluminium extrusion. The extrusion is so formed that after machining it can provide not only the steering column support 123 but also the fixing brackets 122 there being a bridging component 124 formed as an integral part thereof.

As previously described the steering column support member 123 has a number of threaded apertures 117A, 117B, 117C and 117D used to secure a steering column to the support member 123 and two apertures 116A and 116B in the fixing bracket 122 used to secure the fixing bracket to part of the body structure of the motor vehicle.

By combining the fixing bracket 122 with the steering column support member 123 the torsional rigidity of the steering column member 123 relative to the fixing bracket 122 is increased. In addition by using a single aluminium extrusion which can be conveniently machined to provide both components both the accuracy of manufacture and the cost of manufacture are reduced.

It will be appreciated that although the invention has been described with respect to components made from extruded aluminium it could be used to attach components made from other non-ferrous materials or other materials such as reinforced plastic or be made by a different method. For example components could be made from magnesium alloy or from moulded a carbon fibre reinforced composite material and the tube could be made from an aluminium alloy.

In addition it will be appreciated that the airbag housing 14, 114 could be formed as a one piece member with one of the fixing brackets in a similar manner to that in which the steering column member 123 has been formed as a one piece member with the fixing bracket 122.

It will also be appreciated that more than one airbag housing 14, 114 could be supported by a single tubular member 9, 109.

Those skilled in the art will appreciate that the high deformation pressures involved with providing the interference fit in accordance with the above method can create rupture, burst or cracking problems if there is not adequate support for the various components or these components have insufficient strength to resist such deformation. Thus, for example, cavities 50, 51: 150, 151 depicted in the drawings have at least one thin wall which may burst due to the pressures presented in the member 9; 109, particularly if there are already existing material defects such as cracks, etc. In order to relieve this problem, these cavities can be removed or filled such as depicted in the drawings with regard to brackets 12 and 122. However, normally it will be appreciated that the whole assembly including structural member 10 or 110 will be held within an enveloping tool in order to limit pressure induced deformation and so the potential for bursting/cracking.

Unfortunately, with an enveloping tool it will be appreciated that relatively large, retrenching or complex components, such as an airbag housing, may be difficult to accommodate both technically to provide support and in terms of acceptable tool cost. Thus, further in accordance with the present invention, and as depicted in FIG. 5, it is preferable to provide a housing bracket 201 of less complex profile and secured to an elongate member 202. The bracket 201 is secured to the elongate member 202 by an interference fit in accordance with the above-mentioned and description.

The housing bracket includes a key rail 203 upon which an airbag housing 204 is fixed subsequent to securing the bracket 201 to the member 202. The housing 204 is normally slid along the rail 203 and locked in place by a locking pin 205 or adhesive or any other appropriate technique.

It will be appreciated that the housing bracket 201 has a much reduced and less complex profile compared to the airbag housing 204. Thus, the complexity of a supportive and enveloping tool to limit interference fit deformation under pressure is reduced. In such circumstances, it will be easier and cheaper to provide an adequate tool to stop bursting or rupture of the housing bracket 201 and elongate member 202 under pressure.

What is claimed is:

1. A motor vehicle body structural member for supporting at least one motor vehicle component, the motor vehicle body structural member being a transverse beam supporting at least one mounting bracket for attachment behind a dashboard of a motor vehicle, and the transverse beam having a steering column support bracket secured thereto;

wherein the steering column support bracket and the mounting bracket are formed as unitary component, and the motor vehicle body structural member being manufactured by the process comprising the steps of:
selecting a tubular member having a predetermined length;
locating the steering column support bracket having a corresponding aperture therein upon said tubular member.
locating the mounting bracket having a corresponding aperture therein upon said tubular member,
sealing the ends of said tubular member.
introducing fluid to an interior of the tubular member to plastically deform the tubular member into engagement with said steering column support bracket and said mounting bracket so as to provide an interference fit therebetween;
releasing the pressure within the tubular member.

2. The motor vehicle body structural member manufactured according to claim 1, wherein the tubular member comprises a steel tube.

3. The motor vehicle body structural member manufactured according to claim 1, wherein at least one of the individual components comprises extruded aluminum alloy.

4. A motor vehicle body structural member for supporting at least one motor vehicle component, the motor vehicle body structural member being a transverse beam supporting at least one mounting bracket for attachment behind a dashboard of a motor vehicle, and the transverse beam having an airbag housing secured thereto;

wherein the airbag housing and the mounting bracket are formed as unitary component, and the motor vehicle body structural member being manufactured by the process comprising the steps of:
selecting a tubular member having a predetermined length;
locating the airbag housing having a corresponding aperture therein upon said tubular member;
locating the mounting bracket having a corresponding aperture therein upon said tubular member;
sealing the ends of said tubular member;
introducing fluid to an interior of the tubular member to plastically deform the tubular member into engagement with said airbag housing and said mounting bracket so as to provide an interference fit therebetween;
releasing the pressure within the tubular member.

5. The motor vehicle body structural member manufactured according to claim 4, wherein the airbag housing is an individual component fixed to the tubular member via a housing bracket secured to the tubular member.

6. A method of securing a plurality of individual components to a structural member of a motor vehicle body, the method comprising:
selecting a tubular member to form a structural member of the motor vehicle body, the tubular member having opposed first and second ends defining a predetermined length therebetween, and the tubular member defining a transverse cross section;
providing at least a first component having a component aperture slightly larger in size than the transverse cross section of the tubular member, and passing the tubular member through the component aperture of the first component to support the first component between the first and second ends of the tubular member;
providing first and second mounting brackets for facilitating attachment of the structural member to the motor vehicle, providing each of the first and the second mounting brackets with a mounting aperture slightly larger in size than the transverse cross section of the tubular member, and passing the tubular member through the mounting apertures of the first and the second mounting brackets so as to support the first mounting bracket adjacent the first end of the tubular member and support the second mounting bracket adjacent the second end of the tubular member;
sealing the opposed first and second ends of the tubular member;
introducing fluid under pressure to an interior of the tubular member to plastically deform an exterior surface of the tubular member radially outwardly into engagement with an inwardly facing surface of the first component, an inwardly facing surface of the first mounting bracket and an inwardly facing surface of the second mounting bracket to affix the first component, the first mounting bracket and the second mounting bracket to the tubular member solely via an interference fit engagement therebetween; and
removing the fluid under pressure to relieve the pressure within the tubular member.

7. The method according to claim 6, further comprising the step of securing a plurality of components between the first and second ends of the tubular member, and forming each of the plurality of components with a component aperture slightly larger in size than the transverse cross section of the tubular member.

8. The method according to claim 6, further comprising the step of manufacturing the tubular member from a first material and manufacturing the first component from a second dissimilar material.

9. The method according to claim 8, further comprising the steps of manufacturing the tubular member from structural steel tube and manufacturing the first component from a non-ferrous material.

10. The method according to claim 8, further comprising the step of manufacturing the first component by an extrusion process.

11. The method according to claim 6, further comprising the step of using a housing bracket, for supporting an associated separate vehicle component, as the first component.

12. The method according to claim 11, further comprising the step of supporting an airbag housing via the housing bracket secured to the tubular member.

13. The method according to claim 6, further comprising the step of forming the structural member as a transverse beam and fitting the transverse beam behind a dashboard of a motor vehicle.

14. The method according to claim 6, further comprising the step of securing a steering column support bracket to the transverse beam.

* * * * *